US012681522B1

(12) United States Patent
Cadima

(10) Patent No.: US 12,681,522 B1
(45) Date of Patent: Jul. 14, 2026

(54) COOKING APPLIANCE AND KNOB ASSEMBLY THEREOF

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/091,973

(22) Filed: Mar. 27, 2025

(51) Int. Cl.
*G05G 1/10* (2006.01)
*F24C 3/12* (2006.01)
*G05G 5/00* (2006.01)
*G05G 5/05* (2006.01)

(52) U.S. Cl.
CPC ............... *G05G 1/10* (2013.01); *F24C 3/124* (2013.01); *G05G 5/005* (2013.01); *G05G 5/05* (2013.01)

(58) Field of Classification Search
CPC ............ G05G 1/01; G05G 1/08; G05G 1/082; G05G 1/10; G05G 1/12; G05G 5/005; G05G 5/05; F24C 3/124; F24C 5/16; F24C 7/08
See application file for complete search history.

(56) References Cited

U.S. PATENT DOCUMENTS 3,662,618 A * 5/1972 Kroll ...................... H01H 21/50 116/315
4,300,525 A 11/1981 Delgado et al.
5,038,748 A 8/1991 Lockwood et al.
5,048,365 A 9/1991 Webb
5,165,654 A 11/1992 Liu
5,607,611 A 3/1997 Lee
5,771,878 A 6/1998 Lewis et al.
6,000,390 A 12/1999 Evers et al.
6,394,081 B1 5/2002 Aguirre-Esponda et al.
8,434,199 B1 5/2013 Bowen et al.
8,686,306 B2 * 4/2014 Harris .................... B60K 35/10 200/336
8,928,187 B2 1/2015 Hamm et al.
8,967,019 B2 3/2015 O'Keefe et al.
9,803,872 B1 10/2017 Lu et al.
(Continued)

FOREIGN PATENT DOCUMENTS

CH 581353 A5 * 10/1976 ............... G05G 1/10
CN 203785023 U 8/2014
(Continued)

*Primary Examiner* — Adam D Rogers
(74) *Attorney, Agent, or Firm* — Dority & Manning, P.A.

(57) ABSTRACT

A cooking appliance may include a control knob that may be mountable to the cooking appliance at a surface panel of the cooking appliance. The control knob may include an adjustable body that may include a push body and a center projection that may define a body opening. The push body may include a push surface and an outer skirt that may extend from a perimeter of the push surface. The outer skirt may define a plurality of slots therethrough. The control knob may include a static body disposed within the body opening of the center projection. The control knob may include a support plate that may be secured to the adjustable body and positioned in front of the forward face. The support plate may include a plurality of extensions that may extend from a perimeter of the support plate.

20 Claims, 6 Drawing Sheets

(56) References Cited

U.S. PATENT DOCUMENTS

| | | | | |
|---|---|---|---|---|
| 9,823,683 | B2 * | 11/2017 | Livolsi | G05G 1/08 |
| 10,114,405 | B2 | 10/2018 | Swayne et al. | |
| 10,712,015 | B2 | 7/2020 | Bryant et al. | |
| 11,143,411 | B2 | 10/2021 | Kim et al. | |
| 11,365,887 | B2 | 6/2022 | Kim et al. | |
| 11,507,126 | B2 | 11/2022 | Choi | |
| 11,513,551 | B2 | 11/2022 | Cadima | |
| 11,788,730 | B2 | 10/2023 | Daufenbach et al. | |
| 11,828,472 | B2 | 11/2023 | Bang et al. | |
| 11,960,315 | B1 | 4/2024 | Lawson et al. | |
| 2007/0187215 | A1 | 8/2007 | Lavigne et al. | |
| 2016/0329175 | A1 | 11/2016 | Bowen | |
| 2017/0227231 | A1 | 8/2017 | Pionek et al. | |
| 2017/0235328 | A1 | 8/2017 | Swayne et al. | |
| 2017/0254543 | A1 | 9/2017 | Peterson | |
| 2018/0080657 | A1 | 3/2018 | Billman et al. | |
| 2019/0346145 | A1 | 11/2019 | Moon et al. | |
| 2019/0360687 | A1 | 11/2019 | Saavedra et al. | |
| 2019/0361482 | A1 | 11/2019 | Mendoza | |
| 2020/0050233 | A1 | 2/2020 | Lawson | |
| 2020/0103119 | A1 | 4/2020 | Kim et al. | |
| 2020/0149745 | A1 | 5/2020 | Kim et al. | |
| 2020/0248909 | A1 | 8/2020 | Lee et al. | |
| 2020/0300475 | A1 | 9/2020 | Ibrahim | |
| 2020/0378610 | A1 | 12/2020 | Williams et al. | |
| 2021/0265120 | A1 | 8/2021 | Marcotte et al. | |
| 2021/0286396 | A1 | 9/2021 | Izumi et al. | |
| 2021/0286397 | A1 * | 9/2021 | Bhosale | F24C 3/124 |
| 2022/0049850 | A1 | 2/2022 | Cadima et al. | |
| 2023/0243509 | A1 | 8/2023 | V M et al. | |

FOREIGN PATENT DOCUMENTS

| | | | | |
|---|---|---|---|---|
| CN | 204006162 | U | 12/2014 | |
| CN | 205810647 | U | 12/2016 | |
| CN | 105674349 | B | 2/2018 | |
| CN | 207693460 | U | 8/2018 | |
| CN | 210088926 | U | 2/2020 | |
| CN | 211854111 | U | 11/2020 | |
| CN | 213630544 | U | 7/2021 | |
| CN | 117476385 | B | 3/2024 | |
| EP | 3462092 | A1 | 4/2019 | |
| EP | 3505829 | A1 | 7/2019 | |
| FR | 3056474 | A1 * | 3/2018 | H01H 19/11 |
| JP | 2002196834 | A | 7/2002 | |
| JP | 6832565 | B2 | 2/2021 | |
| JP | 6887905 | B2 | 6/2021 | |
| KR | 0135812 | Y1 | 3/1999 | |
| KR | 20240074610 | A | 5/2024 | |
| WO | WO-2009083364 | A2 * | 7/2009 | F24C 3/124 |
| WO | WO-2024107125 | A1 * | 5/2024 | G05G 1/10 |

* cited by examiner

COOKING APPLIANCE AND KNOB ASSEMBLY THEREOF

FIELD OF THE DISCLOSURE

The present subject matter relates generally to a cooking appliance, and more particularly to a knob assembly for a cooking appliance.

BACKGROUND OF THE DISCLOSURE

Knobs are commonly used on a variety of commercial and residential appliances to control an operating condition of the appliance. Knobs are particularly common on cooking appliances, such as stoves or cooktops. Various shapes and sizes can be used depending upon, for example, the intended application, aesthetics, and other factors.

For example, cooking appliances that include a cooktop traditionally have at least one heating element positioned on a panel proximate a cooktop surface for use in heating or cooking an object, such as a cooking utensil, and its contents. The heating element can operate to heat a cooking utensil directly through induction heating or can use another heat source such as electrically resistant coils or gas burners. Commonly, one knob corresponds to one or more heating elements such that rotation of the knob activates, ignites, or otherwise adjusts heat generated at the corresponding heating elements. In order to prevent accidental or inadvertent activation of the corresponding heating elements, many knobs require a compound movement (e.g., a push, a pinch, a squeeze, or the like in combination with a rotation of the knob) to activate or ignite the heating elements from rest (e.g., a state in which no heat is being generated at the heating elements or no fuel is being flowed to the same). For example, a valve or switch box to which the knob is connected can require the knob to be pushed inward before the knob can be rotated (e.g., to adjust the volume of fuel flowed to the heating element or otherwise alter the heat generated at the heating elements).

Certain drawbacks exist with these existing constructions, however. For example, such constructions often require pinching or squeezing efforts from a user before the knob can be rotated. Users having physical limitation, such as decreased hand dexterity, can have difficulties performing these efforts. As another example, existing constructions can still be susceptible to accidental activation that can occur, for instance, when a user leans on the knob and subsequently moves such that the knob is rotated.

Accordingly, a knob assembly that obviates one or more of the above-mentioned drawbacks would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a cooking appliance is provided. The cooking appliance may include a cooktop. The cooking appliance may include a heating element mounted to the cooktop. The cooking appliance may include a surface panel that may be mounted to the cooktop forward from the heating element. The cooking appliance may include the surface panel that may include a forward face and a rearward face. The surface panel may define a central axis that may extend from the rearward face to the forward face. The cooking appliance may include a control knob that may be mounted to cooking appliance at the surface panel. The control knob may include an adjustable body that may include a push body and a center projection that may define a body opening. The push body may include a push surface and an outer skirt that may extend from a perimeter of the push surface. The outer skirt may define a plurality of slots therethrough. The control knob may include a static body that may be disposed within the body opening of the center projection. The control knob may include a support plate that may be secured to the adjustable body and positioned in front of the forward face. The support plate may include a plurality of extensions that may extend from a perimeter of the support plate. Each extension of the plurality of extensions may be positioned within a slot of the plurality of slots. Each extension of the plurality of extensions may be coradial with the outer skirt.

In another exemplary aspect of the present disclosure, a knob assembly for a cooking appliance is provided. The cooking appliance may include a cooktop. The cooking appliance may include a heating element that may be mounted to the cooktop. The cooking appliance may include a surface panel that may be mounted to the cooktop forward from the heating element. The surface panel may include a forward face and a rearward face. The surface panel may define a central axis that may extend from the rearward face to the forward face. The knob assembly may include a control knob that may be mounted to cooking appliance at the surface panel. The control knob may include an adjustable body that may include a push body and a center projection that may define a body opening. The push body may include a push surface and an outer skirt that may extend from a perimeter of the push surface. The outer skirt may define a plurality of slots therethrough. The control knob may include a static body that may be disposed within the body opening of the center projection. The control knob may include a support plate that may be secured to the adjustable body and positioned in front of the forward face. The support plate may include a plurality of extensions that may extend from a perimeter of the support plate. Each extension of the plurality of extensions may be positioned within a slot of the plurality of slots. Each extension of the plurality of extensions may be coradial with the outer skirt.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
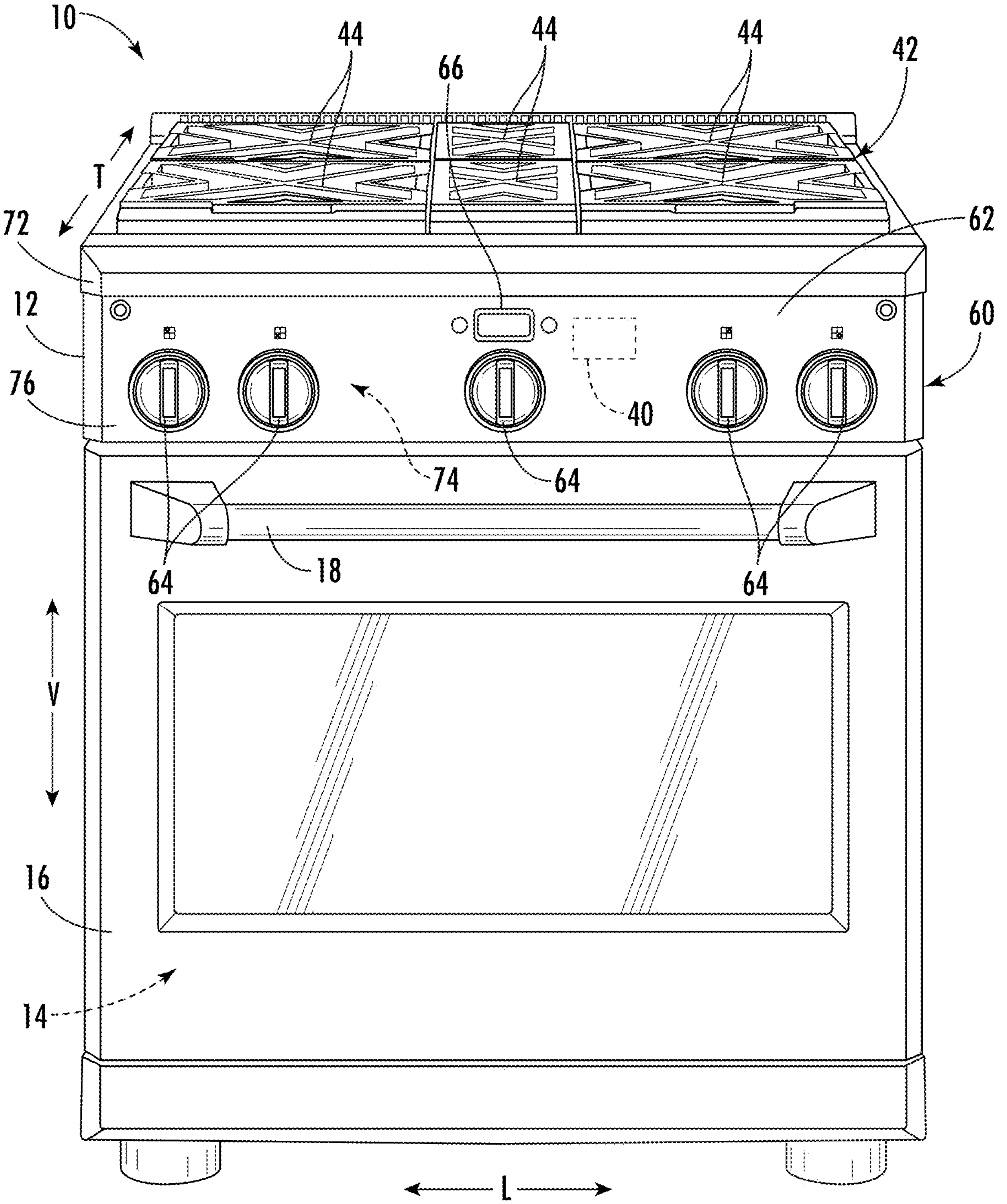
FIG. 1 provides a perspective view of a cooking appliance according to one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Embodiments of the present disclosure provide a knob assembly having one or more features for preventing accidental engagement, for instance, when a user leans on the knob assembly and subsequently moves such that a control knob of the knob assembly is rotated. Notably, the control knob of the exemplary knob assembly includes a support plate that includes plurality of extensions positioned coradial with an outer skirt of an adjustable body. The plurality of extensions of the control knob are extended, for instance, along an axial direction of the knob assembly, from a support plate that may be interfaced with a control panel of the cooking appliance. Thus, the plurality of extensions can advantageously prevent blunt objects from being able to depress the adjustable body, for instance, along the axial direction, while enabling the ability for a user to depress the adjustable body at push surfaces of the adjustable body. In addition, the exemplary knob assembly does not require a user to pinch or squeeze the control knob (e.g., as is often present in existing knob assemblies) to overcome safety mechanisms of the knob assembly. Therefore, users having physical limitation, such as decreased hand dexterity, can advantageously adjust the control knob to activate the appliance without undue stress being applied to the hand of the user.

The support plate also includes a projection that may define an air gap between the adjustable body of the control knob and surface panel of the cooking appliance. The air gap may permit hot convective air (e.g., that may emit from the door of the cooking appliance, such as during a cooking operation) to pass behind the adjustable body of the control knob. Notably, the air gap advantageously prevents or mitigates touch surfaces of the adjustable body, such as the push surfaces of the adjustable body, from overheating from the hot convective air as the hot convective air may pass behind the control knob and not over the touch surfaces (e.g., as is common in many existing cooking appliances).

Turning now to the figures, FIG. 1 provides a perspective view of a cooking appliance, such as an oven appliance 10, according to exemplary embodiments of the present disclosure. Generally, oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable appliance. Thus, the present disclosure may be used with other oven, range, or cooktop appliance configurations (e.g., configurations that define multiple interior cavities for the receipt of food, include no interior cavities, or are otherwise different than the configuration shown in FIG. 1), as well as other suitable appliances, as would be understood in light of the present disclosure.

Oven appliance 10 includes an insulated cabinet 12 with an interior cooking chamber 14 defined by an interior surface of cabinet 12. Cooking chamber 14 is configured for the receipt of one or more food items to be cooked. Oven appliance 10 includes a door 16 rotatably mounted to cabinet 12 (e.g., with a hinge—not shown). A handle 18 may be mounted to door 16 and may assist a user with opening and closing door 16 in order to access an opening to cooking chamber 14. For example, a user can pull on handle 18 to open or close door 16 and access cooking chamber 14 through the opening. As would be understood, one or more internal heating elements (e.g., baking or broiling heating elements) may be provided within cooking chamber 14 to cook or otherwise heat items therein.

Oven appliance 10 may include a seal between door 16 and cabinet 12 that assist with maintaining heat and cooking fumes within cooking chamber 14 when door 16 is closed, as shown in FIG. 1. One or more parallel glass panes 22 provide for viewing the contents of cooking chamber 14 when door 16 is closed and assist with insulating cooking chamber 14. Optionally, a baking rack may be positioned in cooking chamber 14 for the receipt of food items or utensils containing food items.

In some embodiments, oven appliance 10 includes a cooktop surface 42 having one or more heating elements 44 for use in heating or cooking operations. In exemplary embodiments, cooktop surface 42 includes a metal (e.g., steel) panel on which one or more grates may be supported. In other embodiments, however, cooktop surface 42 includes another suitable material, such as a ceramic glass or another suitable non-metallic material. Heating elements 44 may be various sizes, as shown in FIG. 1, and may employ any suitable method for heating or cooking an object, such as a cooking utensil (e.g., a pot, pan, or the like), and its contents. In one embodiment, for example, heating element uses a heat transfer method, such as electric coils or gas burners, to heat the cooking utensil. In another embodiment, however, heating element 44 uses an induction heating method to heat the cooking utensil directly. In turn, heating element may include a burner element, electric heat element, induction element, or another suitable heating element.

Some embodiments of oven appliance 10 include a controller 40 (e.g., configured to control one or more operations of oven appliance 10). For example, controller 40 may control at least one operation of oven appliance 10 that includes an internal heating element or cooktop heating element 44. Controller 40 may be in communication (via for example a suitable wired or wireless connection) with one or more of heating element(s) 44 and other suitable components of oven appliance 10, as discussed herein. In general, controller 40 may be operable to configure oven appliance 10 (and various components thereof) for cooking. Such configuration may be based, for instance, on a plurality of cooking factors of a selected operating cycle or mode.

By way of example, controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 40 may be positioned in a variety of locations throughout oven appliance 10. As illustrated, controller 40 may be located within a user interface 62 of oven appliance 10. In some such embodiments, input/output ("I/O") signals may be routed between controller 40 and various operational components of oven appliance 10, such as heating element (s) 44, control knobs 64, display component 66, sensors, alarms, or other components as may be provided. For instance, signals may be directed along one or more wiring harnesses that may be routed through cabinet 12. In some embodiments, controller 40 is in communication with user interface assembly 62 and control knobs 64 through which a user may select various operational features and modes and monitor progress of oven appliance 10. In one embodiment, user interface assembly 62 may represent a general purpose I/O ("GPIO") device or functional block. In one embodiment, user interface assembly 62 may include input components, such as one or more of a variety of electrical, mechanical, or electro-mechanical input devices including rotary dials, push buttons, and touch pads. User interface assembly 62 may include a display component 66, such as a digital or analog display configured to provide operational feedback to a user.

During use of oven appliance 10, the amount of heat delivered by each heating element 44 on cooktop 42 may be controlled by controller 40 and a corresponding knob assembly 60, described in detail below. For instance, knob assembly 60 may include one or more control knobs 64 mounted (e.g., rotatably) on a surface panel 76 of user interface 62 forward from heating elements 44 (e.g., along or relative to the transverse direction T). Each control knob 64 may correspond to a discrete heating element 44.

Figure 2:
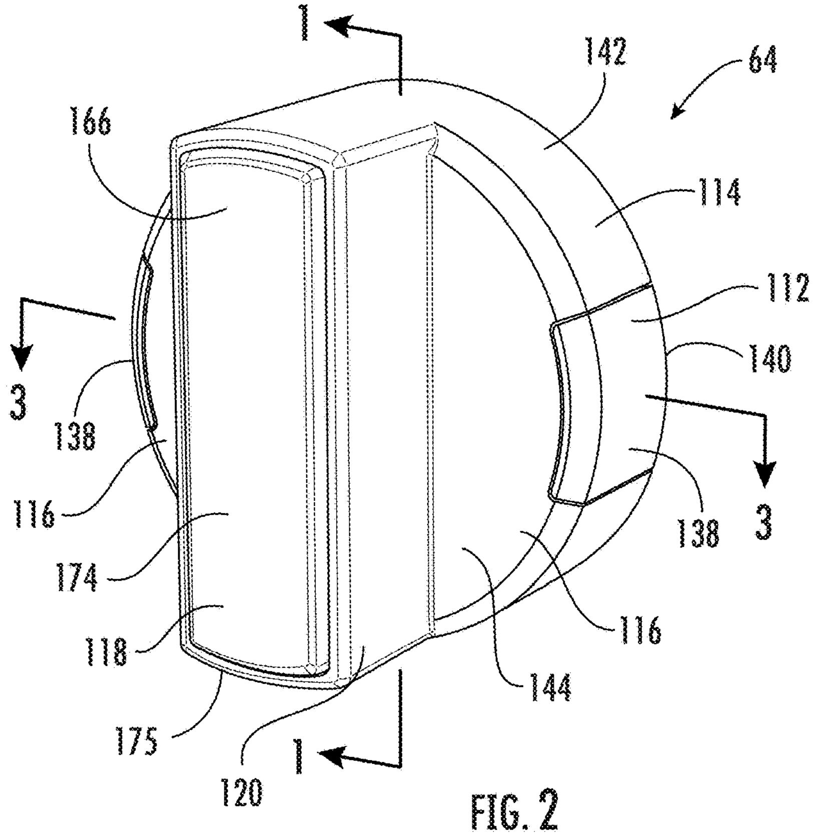
FIG. 2 provides a perspective view of a control knob of the exemplary cooking appliance of FIG. 1, wherein the control knob is in a static state.
Figure 3:
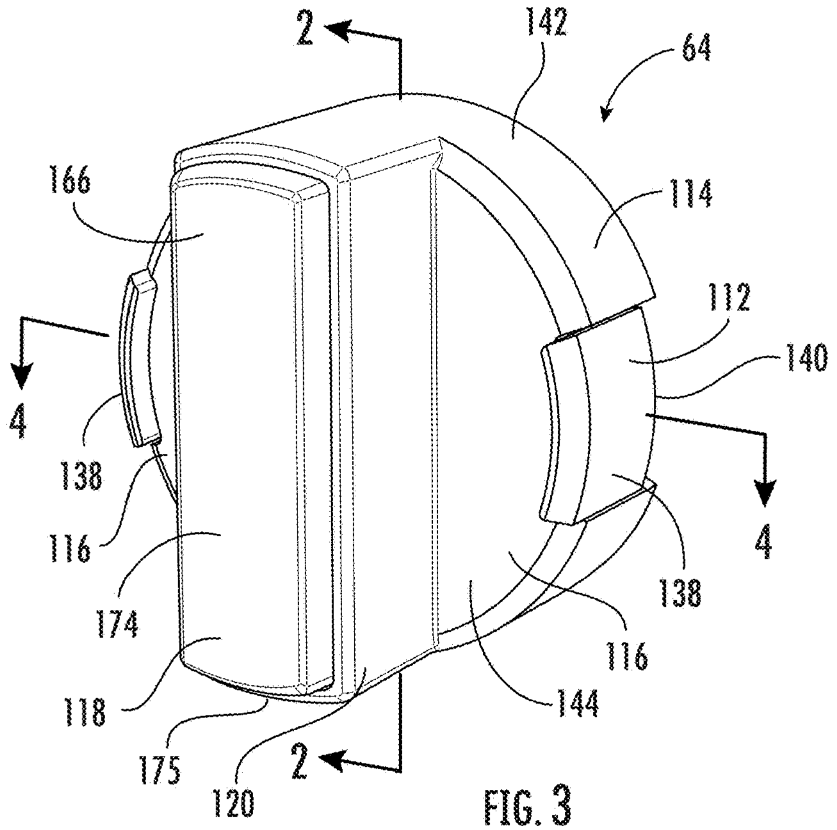
FIG. 3 provides a perspective view of a control knob of the exemplary cooking appliance of FIG. 1, wherein the control knob is in an adjustable state.
Figure 4:
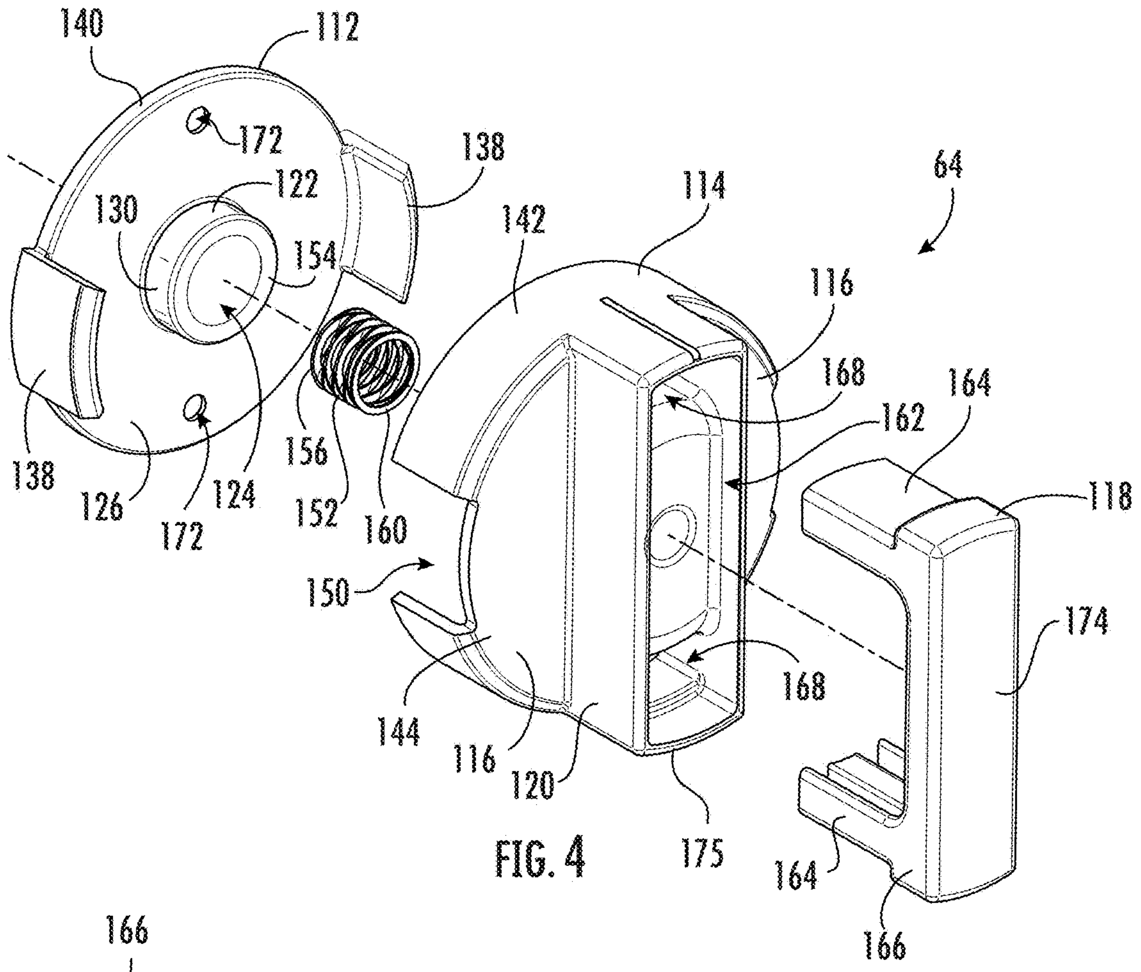
FIG. 4 provides an exploded perspective view of a control knob of the exemplary cooking appliance of FIG. 1.
Figure 5:
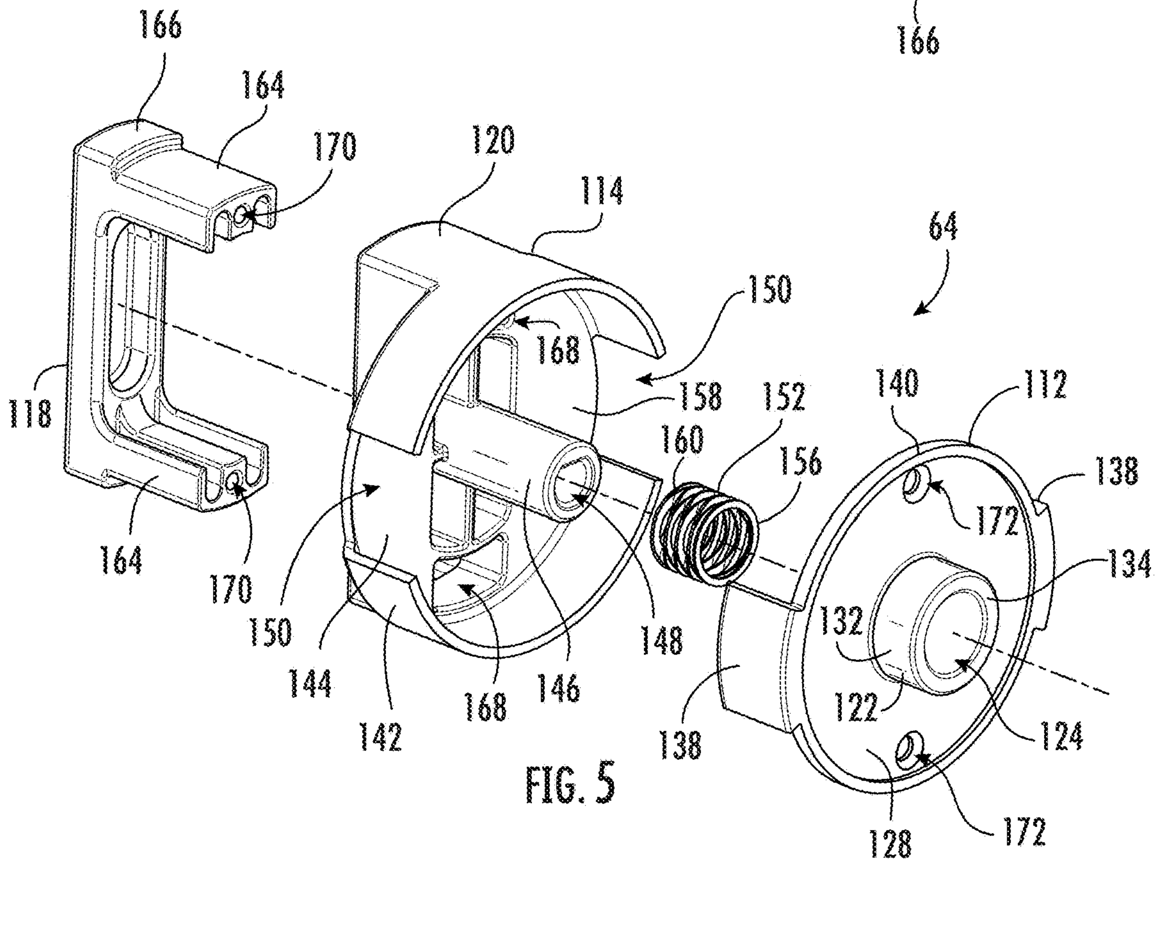
FIG. 5 provides an exploded perspective view of a control knob of the exemplary cooking appliance of FIG. 1.
Figure 6:
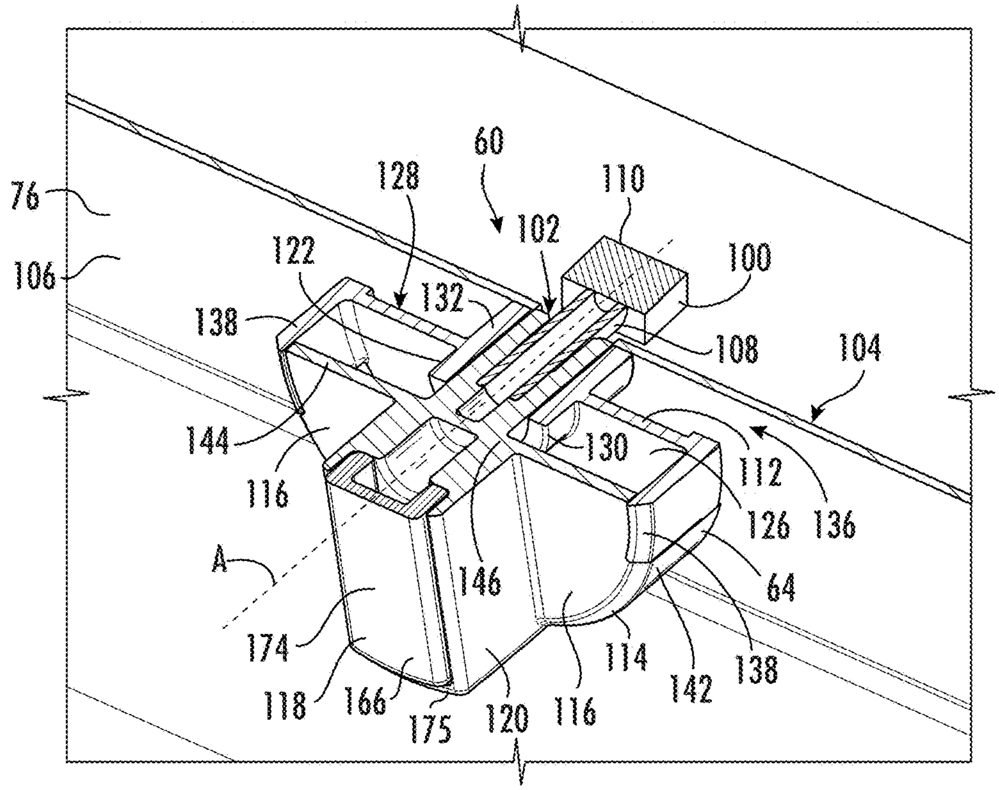
FIG. 6 provides a sectional perspective view of a knob assembly of the exemplary cooking appliance of FIG. 1, wherein the knob assembly is in a static state.
Figure 7:
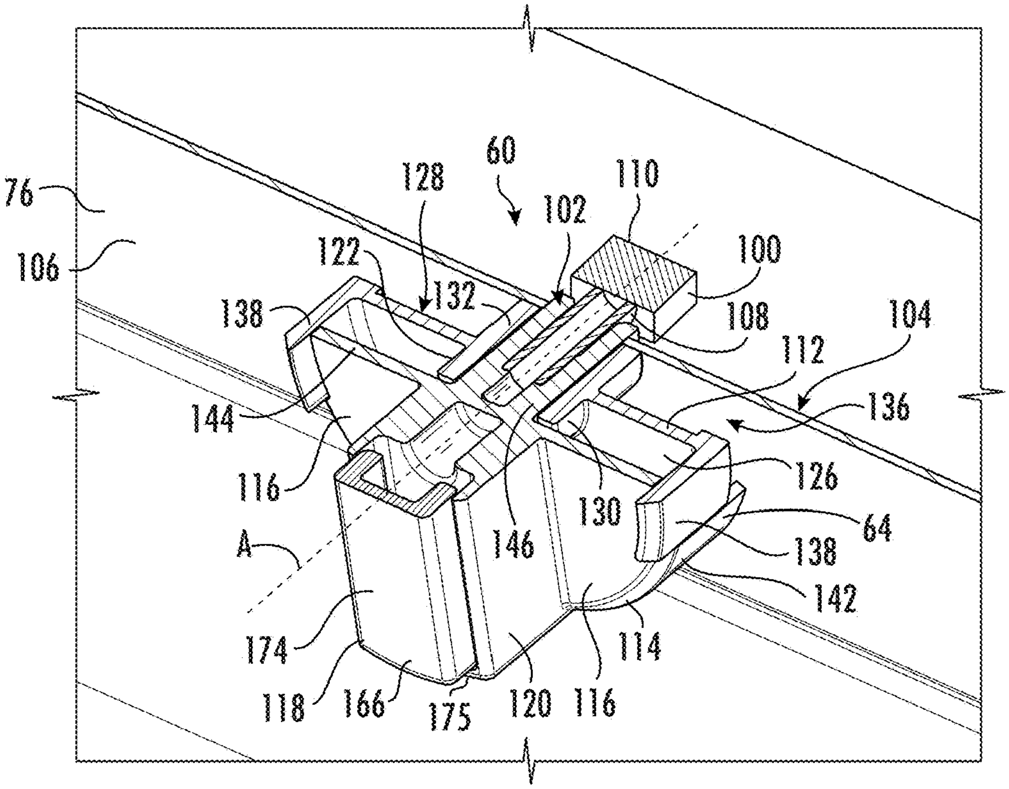
FIG. 7 provides a sectional perspective view of a knob assembly of the exemplary cooking appliance of FIG. 1, wherein the knob assembly is in an adjustable state.
Figure 8:
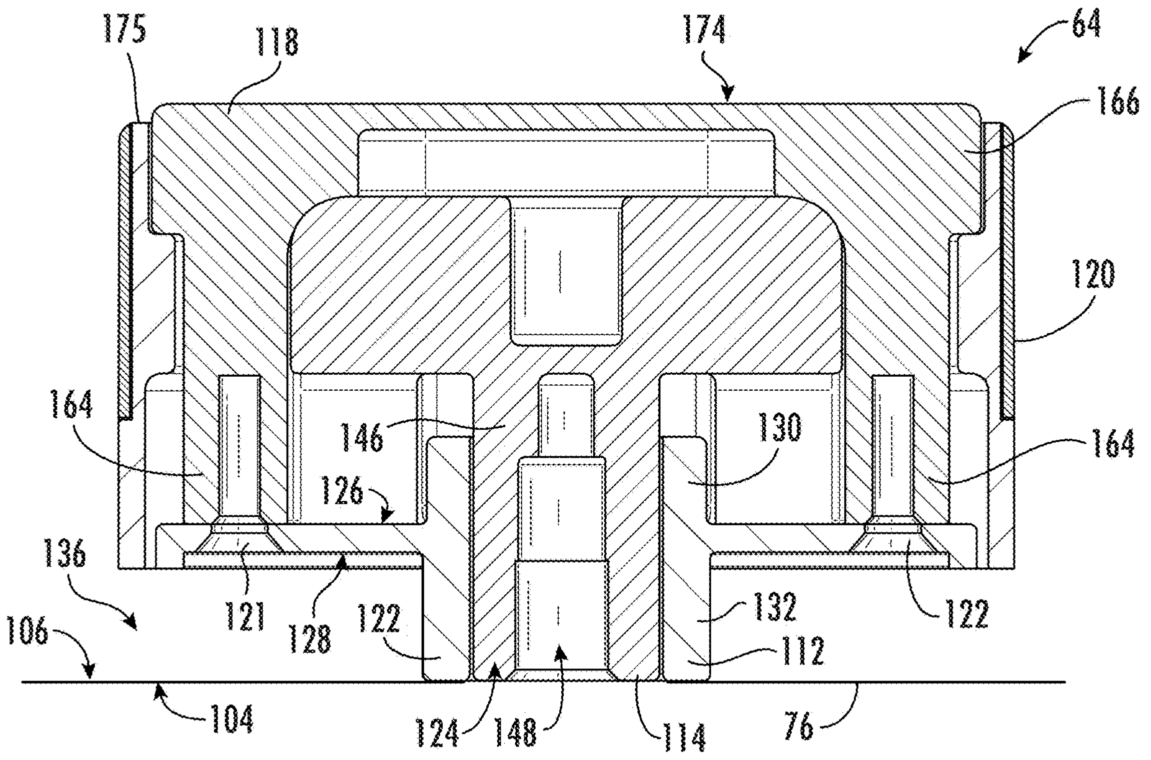
FIG. 8 provides a cross-sectional view of the control knob of FIG. 2 taken along line 1-1.
Figure 9:
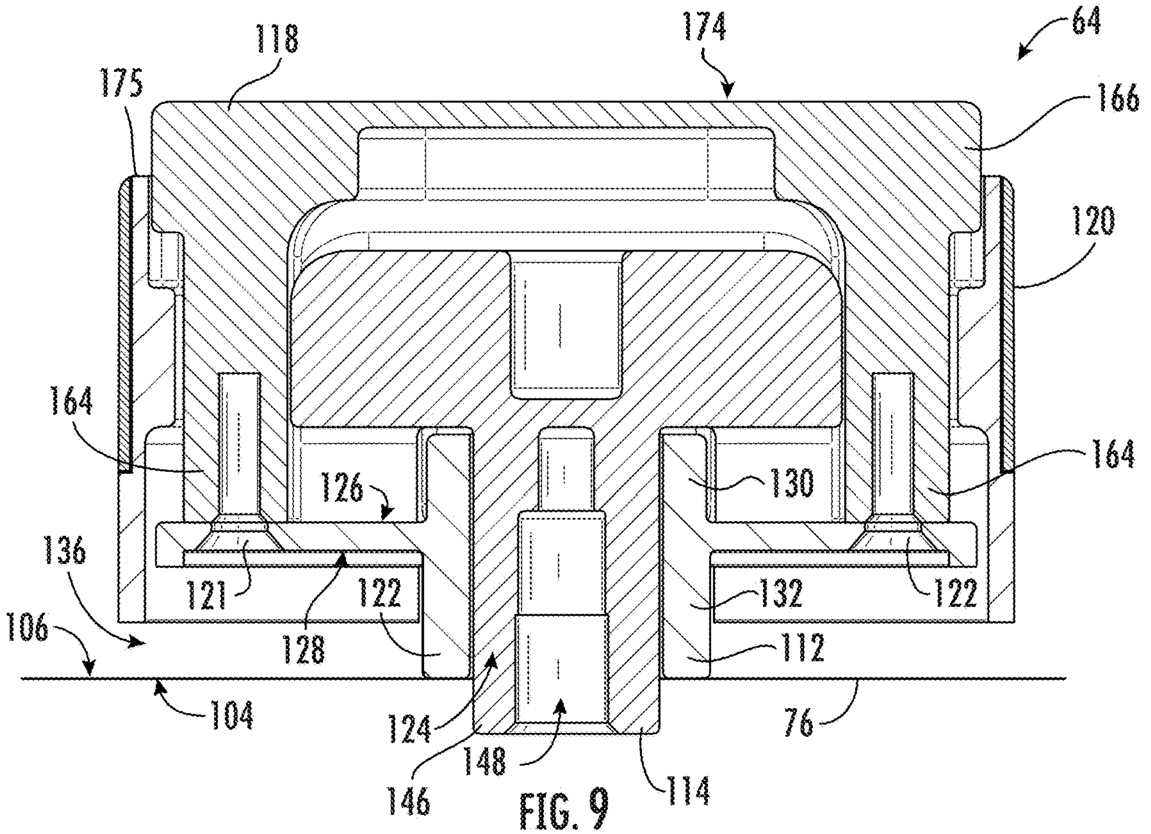
FIG. 9 provides a cross-sectional view of the control knob of FIG. 3 taken along line 2-2.
Figure 10:
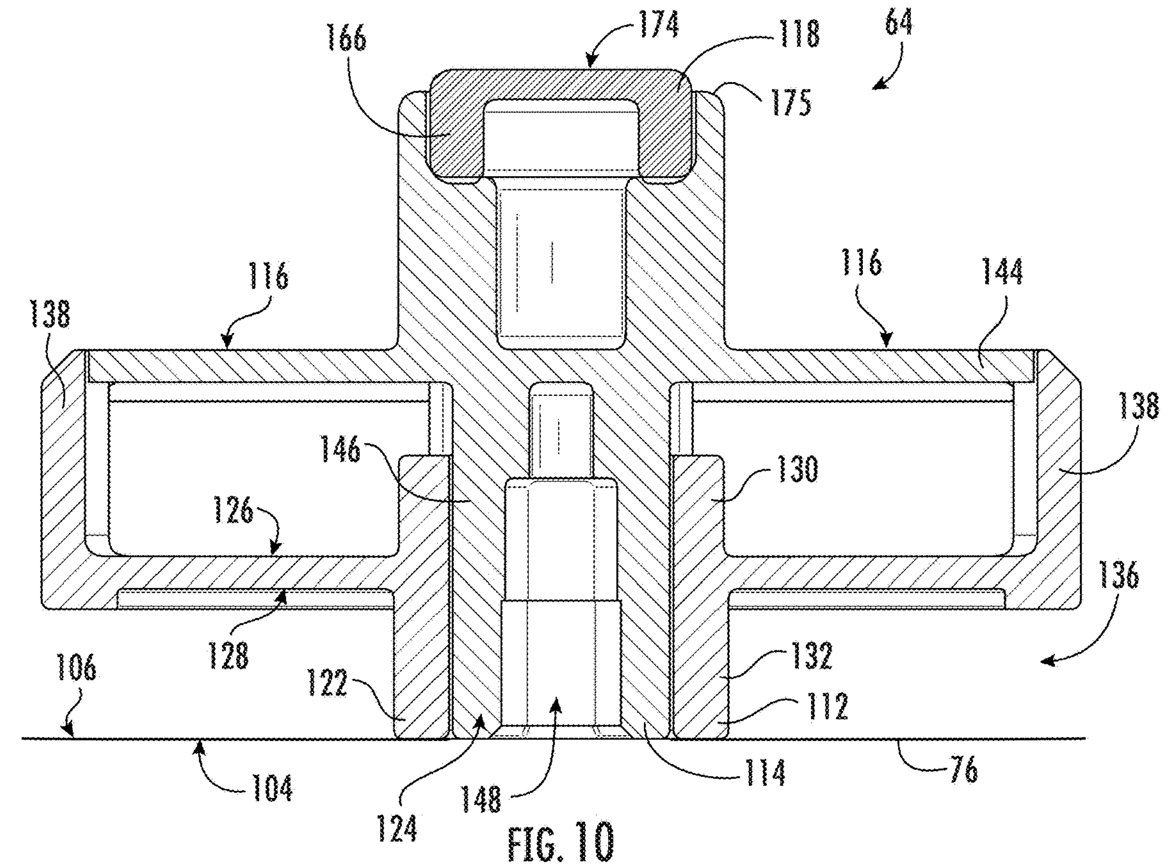
FIG. 10 provides a cross-sectional view of the control knob of FIG. 2 taken along line 3-3.
Figure 11:
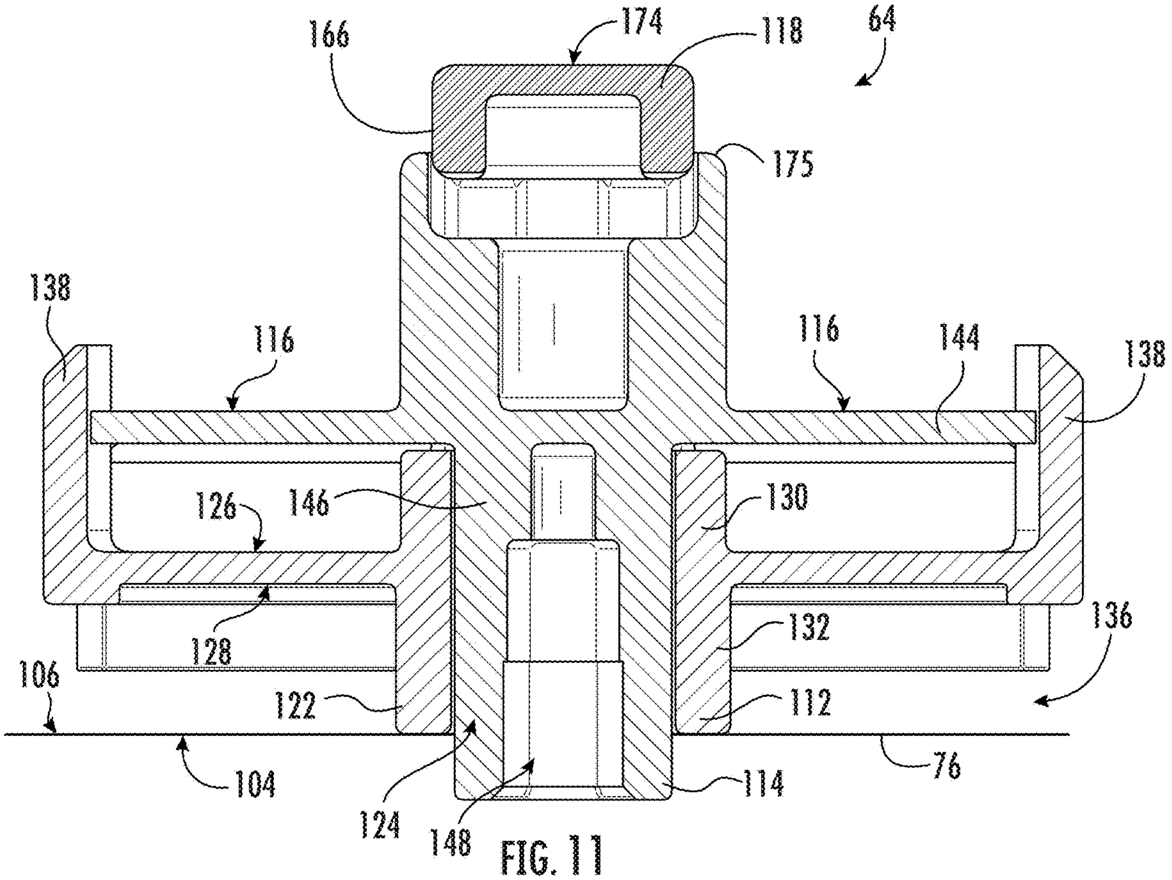
FIG. 11 provides a cross-sectional view of the control knob of FIG. 3 taken along line 4-4.

Turning now to FIGS. 2 through 11, various views are provided of a particular knob assembly 60 (e.g., including one control knob 64 being mountable to the cooking appliance 10) and portions thereof, such as might be provided at a particular knob assembly 60 in FIG. 1. In particular, FIGS. 2 and 3 provide perspective views of the control knob 64 of the knob assembly 60 in a static state and an adjustable state, respectively, FIGS. 4 and 5 provide exploded perspective views of the control knob 64, FIGS. 6 and 7 provide sectional views of knob assembly 60 mounted to the surface panel 76 in the static state and the adjustable state, respectively, FIG. 8 provides a cross-sectional view of FIG. 2 taken along line 1-1, FIG. 9 provides a cross-sectional view of FIG. 3 taken along line 2-2. FIG. 10 provides a cross-sectional view of FIG. 2 taken along line 3-3, and FIG. 11 provides a cross-sectional view of FIG. 3 taken along line 4-4.

The knob assembly 60 may include a knob switch 100 and control knob 64, which are connected to each other and mounted on surface panel 76. In some embodiments, surface panel 76 defines one or more openings 102 that each define an axis to permit mechanical or electrical connections between portions of knob assembly 60 or controller 40 (e.g., within cabinet 12). For example, as shown in FIGS. 6 and 7, the surface panel 76 may define the opening 102 having a central axis A extending from a rearward face 104 to a forward face 106 of surface panel 76 (e.g., perpendicular to the surface panel 76 or vertical direction V). Knob switch 100 may be disposed behind surface panel 76 (e.g., at the rearward face 104) while the control knob 64 is disposed in front of surface panel 76 (e.g., at the forward face 106).

The knob switch 100 may be provided as any suitable mechanism or device configured for detecting, or communicating a signal relating to, the rotational position of the control knob 64. For example, the knob switch 100 may include or be provided as a potentiometer, a digital encoder, or the like. In some exemplary embodiments, the knob switch 100 includes a suitable mechanical valve or electrical switch in communication with a slidable stem 108 and internal spring (not shown) of knob switch 100. The slidable stem 108 may be extended from a switch body 110 and through the surface panel 76 to form part of a suitable input mechanism for controlling a valve position or detecting and communicating a signal relating to the rotational position of control knob 64. The internal spring may bias slidable stem 108 forward. During use, rotation of control knob 64 and the slidable stem 108 about the central axis A may alternately increase or decrease a voltage signal and, in turn, alternately increase or decrease an output of a heating element (e.g., heating element 44), as would be understood. Moreover, as would further be understood, internal spring may be in forward-biased mechanical communication with the slidable stem 108 to require rearward translation of slidable stem 108 to permit subsequent rotation. Thus, after initially pushing slidable stem 108 rearward, slidable stem 108 may be permitted to rotate freely (e.g., within a predefined angle or circumferential path).

In some embodiments, control knob 64 includes various components that are generally mounted along and about a portion of central axis A (e.g., to direct the rotational position of slidable stem 108). Specifically, control knob 64 may include a support plate 112 that is rotatably mounted about the slidable stem 108 in front of the forward face 106. The control knob 64 may include an adjustable body 114 having or defining push surfaces 116 that may be rotationally fixed to the support plate 112 (e.g., while being slidable relative to the same). The control knob 64 may further include a static body 118 that may be disposed within a center projection 120 of the adjustable body 114.

The support plate 112 may be held in place or otherwise secured to the control knob 64 via one or more mechanical fasteners 121 (e.g., as shown in FIGS. 8 and 9). The mechanical fasteners 121 may include or be provided as any suitable fastener that may secure or fasten the support plate 112 to the control knob 64. For example, the one or mechanical fasteners 121 may include one or more screws, bolts, or the like. For instance, the support plate 112 may be directly secured to the static body 118 and indirectly (e.g., via the static body 118) secured to the adjustable body 114 via the one or more mechanical fasteners 121.

In additional or alternative embodiments, one or more components of the control knob 64, such as the support plate 112, the adjustable body 114, or the static body 118 may include integrated fastening means, such as snaps, tabs, or the like that are configured for further securing or coupling the one or more components of the control knob 64.

When assembled, support plate 112 may be permitted to rotate relative to surface panel 76 while being axially static. In other words, support plate 112 may function to rotate about the central axis A, but maintain a constant axial position relative to the central axis A. In some such embodiments, support plate 112 includes a projection 122 extending from the support plate 112. The projection 122 may define a center hole 124 through the support plate 112 that may be aligned coaxially with the central axis A, for instance, when the control knob 64 is mounted on the surface panel 76. In particular, the support plate 112 may include a front surface 126 and a rear surface 128. The projection 122 may include a first portion 130 and a second portion 132 that form the projection 122. The first portion 130 may extend from the front surface 126 of the support plate 112 and the second portion 132 may extend from the rear surface 128 of the support plate 112. The second portion 132 may include a contact surface 134 that may be interfaced with or against the forward face 106 of the surface panel 76.

The rear surface 128 of the support plate 112 and the forward face 106 of the surface panel 76 may define an air gap 136 therebetween. The size of the air gap 136 (e.g., the distance between the rear surface 128 of the support plate 112 and the forward face 106 of the surface panel 76) may be defined by the second portion 132, and more particularly, by a height of the second portion 132. As the height of the second portion 132 is fixed or predetermined, the size of the air gap 136 may be fixed or predetermined. Notably, during operation of the cooking appliance 10, hot convective air may rise from the door 16 of the cooking appliance 10. As the exemplary control knob 64 defines the air gap 136, the hot convective air may advantageously pass behind the control knob 64 (e.g., when compared to control knobs that do not include an air gap 136 and may deflect the hot convective air over of the control knob 64). In this regard, hot convective air that passes over the touch surfaces of the control knob 64 (e.g., surfaces of the control knob 64 a user may touch or engage with, such as the push surfaces 116) may be mitigated or eliminated.

In addition, the support plate 112 may include plurality of extensions 138 (e.g., two or more extensions 138) that may extend from a perimeter 140 of the support plate 112. As will be appreciated in more detail below, the plurality of extensions 138 may be coradial with an outer skirt 142 of the adjustable body 114. For example, the plurality of extensions 138 and the outer skirt 142 of the adjustable body 114 may each share the center point (e.g., center axis A) and the same radial distance from the center point (e.g., central axis A).

The adjustable body 114 may generally be disposed in front of support plate 112. Specifically, the adjustable body 114 may be mounted to the slidable stem 108 to move therewith. Thus, the adjustable body 114 may be slidable relative to support plate 112. Moreover, the adjustable body 114 may be rotationally fixed to support plate 112 such that rotation of the adjustable body 114 and slidable stem 108 may also rotate support plate 112.

The adjustable body 114 may include or define a push body 144. The push body 144 may include the push surfaces 116 that extend outward, for instance, radially outward, from the slidable stem 108. In particular, push surfaces 116 may be radially spaced apart or outward from slidable stem 108 to permit a user to push the adjustable body 114. A center cylinder 146 of adjustable body 114, which is disposed radially inward from the push body 144, may bridge the radial space between slidable stem 108 and push body 144 (e.g., behind the center projection 120). In certain embodiments, center cylinder 146 extends across the central axis A. Moreover, the center cylinder 146 may provide an attachment surface or structure to connect the adjustable body 114 to the slidable stem 108. For instance, center cylinder 146 may define a slot 148 that is matched to the slidable stem 108. In other words, the shape of slot 148 may form the negative of the profile shape (e.g., a circular or non-circular profile shape) of the slidable stem 108 such that the slot 148 can receive the slidable stem 108 and be rotated by the same.

The adjustable body 114 may further include an outer skirt 142 extending from a perimeter of the adjustable body 114. For instance, the outer skirt 142 may extend to or toward the frontward surface of the surface panel 76. The outer skirt 142 may define a plurality of slots 150 (e.g., two or more slots 150) for the receipt of a discrete extension of the plurality of extensions 138. For example, each extension of the plurality of extensions 138 may be nested within a respective slot 150 of the plurality of slots 150 such that the plurality of extensions 138 and the outer skirt 142 are coradial (e.g., define the same radius from the central axis A). In this regard, the plurality of extensions 138 and the outer skirt 142 may generally form a circular cross-section. Each extension 138 of the plurality of extensions 138 may define less than fifty percent of the arc length of the circular cross-section. For example, each extension 138 of the plurality of extensions 138 may define up to forty percent of the arc length of the circular cross-section, such as up to thirty percent of the arc length of the circular cross-section, such as up to fifteen percent of the arc length of the circular cross-section, or any other suitable arc length of the circular cross section that is less than fifty percent of the arc length of the circular cross-section.

When assembled, the adjustable body 114 may be biased forward from or at a point apart from slidable stem 108. For instance, an external spring 152 may be disposed between the support plate 112 and the adjustable body 114. Specifically, the adjustable body 114 may be in forward-biased mechanical communication with external spring 152. The first portion 130 of the projection 122 may include a spring surface 154 to engage the external spring 152 at a rear end 156 of the external spring 152. The push body 144 may include a spring surface 158 opposite of the push surface 116. A front end 160 of the external spring 152 may be positioned around the center projection 120 and may engage with the spring surface 158 of the push body 144. As shown, the external spring 152 may be formed or provided as a coiled compression spring (e.g., to bias the adjustable body 114 forward relative to support plate 112). Nonetheless, any suitable spring structure (e.g., leaf spring, sponge spring, torsion spring, etc.) may be provided between the support plate 112 and the adjustable body 114. In turn, external spring 152 may further bias adjustable body 114 toward a static state (e.g., FIGS. 2, 6, 8, and 10), even after a user has axially depressed adjustable body 114 to a rearward adjustable state (e.g., FIGS. 3, 7, 9, and 11) wherein adjustable body 114 and slidable stem 108 may be rotated. Since slidable stem 108 is generally fixed relative to the adjustable body 114, axial movement of the adjustable body 114 between the static and adjustable states may similarly move slidable stem 108 (e.g., relative to surface panel 76 or a portion of the knob switch 100, which houses internal spring and a valve or electronic switch, as is understood).

Separate from adjustable body 114, the static body 118 may be included with knob assembly 60. Specifically, the static body 118 may be disposed within a body opening 162 defined by the center projection 120 of the adjustable body 114, for instance, inward of the push body 144. The static body 118 may include a plurality of mount feet 164 that extend from a head portion 166 of the static body 118. The plurality of mount feet 164 may each be extended toward the surface panel 76. The plurality of mount feet 164 may each be extended through the body opening 162 and a plurality of feet apertures 168 defined through the push body 144 such that fastener holes 170 defined through a rear surface of each foot of the plurality of mount feet 164 may align with the fastener holes 172 defined through the support plate 112. In this regard, mechanical fasteners 121 may be extended through the fastener holes 172 of the support plate 112 and the fastener holes 170 of the static body 118 to secure the static body 118 (e.g., directly) and the adjustable body 114 (e.g., indirectly via the static body 118) to the support plate 112.

The static body 118 may be "static" in that it is configured as an axially static member that is not permitted to slide with slidable stem 108 relative to surface panel 76. Additionally or alternatively, the static body 118 may define a stop surface 174 that may be disposed flush with or forward from adjustable body 114 (e.g., the entirety of the adjustable body 114 depending on the state of the adjustable body 114 110). As shown in FIGS. 2, 6, 8, and 10, stop surface 174 may be positioned flush to proud with the center projection 120 of the adjustable body 114 when the adjustable body 114 is in the static state. In particular, the stop surface 174 may be positioned in line with or slightly forward of the distal or forward most edge 175 of the center projection 120 of the adjustable body 114 when the adjustable body 114 is in the static state. As shown in FIGS. 3, 7, 9, and 11, stop surface 174 may be forward of the center projection 120 (e.g., a distal or forward most edge of the center projection 120) of the adjustable body 114 when the adjustable body 114 is in the adjustable state.

The plurality of extensions 138 or the static body 118 advantageously prevent unintentional or accidental depression of the adjustable body 114 of the knob assembly 60. In particular, the plurality of extensions 138 or the stop surface 174 of the static body 118 may (e.g., together) prevent a solid mass or a blunt object, such as a user's waist or midsection, an animal's paw, child's hand, or the like, that is moved toward knob assembly 60 from unintentionally or accidentally pushing or applying force (e.g., approximately in the direction of the central axis A) to the push body 144. Notably, the positions of the plurality of extensions 138 and the static body 118 (e.g., relative to the adjustable body 114) advantageously require force applied to the adjustable body 114 to be localized at portions, such as the push surfaces 116, of the push body 144. In this regard, the adjustable body 114 may only be moved when a user applies localized forced, such as via fingers of the user's hand, to the push surfaces 116.

As an illustrative example, during use, a user may activate or ignite a heating element, such as a particular heating element 44 from a rest state by pushing against the push surfaces 116 of a corresponding control knob 64 to move the adjustable body 114 from the static state toward the adjustable state. As the adjustable body 114 is pushed rearward, slidable stem 108 may also slide rearward into the switch body 110 of knob switch 100, thereby compressing internal spring and external spring 152. As shown, the static body 118 and the plurality of extensions 138 may each remain axially static even as the adjustable body 114 moves rearward to the adjustable state. In the adjustable state, the adjustable body 114 and slidable stem 108 may be permitted to rotate to activate, ignite, or otherwise vary heat generated at the corresponding heating element. Once a user has completed adjustment of the heat (e.g., moved the control knob 64 to a desired setting or rotational position), the user may release the adjustable body 114, thereby allowing external spring 152 to motivate the adjustable body 114 forward (e.g., back towards the static state). In the desired setting or rotational position, the slidable stem 108 may not snap out of the locked position until the control knob 64 is returned to a rest state that corresponds to an OFF position of the particular heating element. Thus, other than in the OFF position, the slidable stem 108 may stay depressed to continue to allow rotation without pushing of the adjustable body 114.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob assembly for a cooking appliance, the cooking appliance comprising a cooktop, a heating element mounted to the cooktop, a surface panel mounted to the cooktop forward from the heating element, the surface panel comprising a forward face and a rearward face, the surface panel defining a central axis extending from the rearward face to the forward face, the knob assembly comprising:

a control knob mountable to the cooking appliance at the surface panel, the control knob comprising:

an adjustable body comprising a push body and a center projection defining a body opening, the push body comprising a push surface and an outer skirt extending from a perimeter of the push surface, the outer skirt defining a plurality of slots therethrough, a static body disposed within the body opening of the center projection, and a support plate secured to the adjustable body and positioned in front of the forward face, the support plate comprising a plurality of extensions extending from a perimeter of the support plate, wherein each extension of the plurality of extensions is positioned within a slot of the plurality of slots, and wherein each extension of the plurality of extensions is coradial with the outer skirt.

2. The knob assembly of claim 1, wherein the support plate further comprises a front surface, a rear surface, and a projection defining a center hole of the support plate, wherein the projection comprises a first portion extended from the front surface, and wherein the projection comprises a second portion extending from the rear surface.

3. The knob assembly of claim 2, wherein the second portion is interfaced with the forward face of the surface panel, wherein the rear surface of the support plate and the forward face of the surface panel define an air gap therebetween, and wherein a size of the air gap is defined by the second portion.

4. The knob assembly of claim 2, wherein the control knob further comprises an external spring being interfaced with a spring surface of the first portion and a spring surface of the adjustable body, and wherein the adjustable body is in forward-biased mechanical communication with the external spring.

5. The knob assembly of claim 1, further comprising:

a knob switch being disposed behind the surface panel, the knob switch comprising a slidable stem extending through the central axis.

6. The knob assembly of claim 5, wherein the adjustable body comprises a center cylinder positioned radially inward from the push body and behind at least a portion of the static body, and wherein the adjustable body is mounted to the slidable stem at the center projection.

7. The knob assembly of claim 6, wherein the center cylinder defines a slot matched to the slidable stem to be rotated thereby, and wherein the slidable stem is received within the slot.

8. The knob assembly of claim 1, wherein the static body comprises a head portion and a plurality of mount feet, wherein the plurality of mount feet each extend from the head portion toward the surface panel, and wherein the plurality of mount feet are positioned within feet apertures defined through the push body.

9. The knob assembly of claim 8, wherein the plurality of mount feet are secured to the support plate via one or more mechanical fasteners.

10. The knob assembly of claim 1, wherein the static body comprises a stop surface that is axially fixed, wherein the stop surface is flush to proud with a distal edge of the center projection relative to the central axis in a static state of the control knob, and wherein the stop surface is forward of the distal edge of the center projection relative to the central axis in an adjustable state of the control knob.

11. A cooking appliance comprising:

a cooktop;

a heating element mounted to the cooktop;

a surface panel mounted to the cooktop forward from the heating element, the surface panel comprising a forward face and a rearward face, the surface panel defining a central axis extending from the rearward face to the forward face; and a control knob mounted to the cooking appliance at the surface panel, the control knob comprising:

an adjustable body comprising a push body and a center projection defining a body opening, the push body comprising a push surface and an outer skirt extending from a perimeter of the push surface, the outer skirt defining a plurality of slots therethrough, a static body disposed within the body opening of the center projection, and a support plate secured to the adjustable body and positioned in front of the forward face, the support plate comprising a plurality of extensions extending from a perimeter of the support plate, wherein each extension of the plurality of extensions is positioned within a slot of the plurality of slots, and wherein each extension of the plurality of extensions is coradial with the outer skirt.

12. The cooking appliance of claim 11, wherein the support plate further comprises a front surface, a rear surface, and a projection defining a center hole of the support plate, wherein the projection comprises a first portion extended from the front surface, and wherein the projection comprises a second portion extending from the rear surface.

13. The cooking appliance of claim 12, wherein the second portion is interfaced with the forward face of the surface panel, wherein the rear surface of the support plate and the forward face of the surface panel define an air gap therebetween, and wherein a size of the air gap is defined by the second portion.

14. The cooking appliance of claim 12, wherein the control knob further comprises an external spring being interfaced with a spring surface of the first portion and a spring surface of the adjustable body, and wherein the adjustable body is in forward-biased mechanical communication with the external spring.

15. The cooking appliance of claim 11, further comprising:

a knob switch being disposed behind the surface panel, the knob switch comprising a slidable stem extending through the central axis.

16. The cooking appliance of claim 15, wherein the adjustable body comprises a center cylinder positioned radially inward from the push body and behind at least a portion of the static body, and wherein the adjustable body is mounted to the slidable stem at the center projection.

17. The cooking appliance of claim 16, wherein the center cylinder defines a slot matched to the slidable stem to be rotated thereby, and wherein the slidable stem is received within the slot.

18. The cooking appliance of claim 11, wherein the static body comprises a head portion and a plurality of mount feet, wherein the plurality of mount feet each extend from the head portion toward the surface panel, and wherein the plurality of mount feet are positioned within feet apertures defined through the push body.

19. The cooking appliance of claim 18, wherein the plurality of mount feet are secured to the support plate via one or more mechanical fasteners.

20. The cooking appliance of claim 11, wherein the static body comprises a stop surface that is axially fixed, wherein the stop surface is flush to proud with a distal edge of the center projection relative to the central axis in a static state of the control knob, and wherein the stop surface is forward of the distal edge of the center projection relative to the central axis in an adjustable state of the control knob.

* * * * *